(12) United States Patent
Murata

(10) Patent No.: US 8,298,694 B2
(45) Date of Patent: Oct. 30, 2012

(54) POWER SUPPLY DEVICE

(75) Inventor: Takashi Murata, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 631 days.

(21) Appl. No.: 12/522,561

(22) PCT Filed: Jan. 9, 2008

(86) PCT No.: PCT/IB2008/000031
§ 371 (c)(1),
(2), (4) Date: Jul. 9, 2009

(87) PCT Pub. No.: WO2008/093183
PCT Pub. Date: Aug. 7, 2008

(65) Prior Publication Data
US 2010/0068611 A1  Mar. 18, 2010

(30) Foreign Application Priority Data
Feb. 1, 2007  (JP) ................................. 2007-023588

(51) Int. Cl.
*H01M 2/38* (2006.01)

(52) U.S. Cl. ................. 429/67; 429/62; 429/68; 429/69
(58) Field of Classification Search ................... 429/62, 429/67–72, 177, 182
See application file for complete search history.

(56) References Cited

U.S. PATENT DOCUMENTS

2006/0113965 A1    6/2006    Jeon et al.
2007/0128505 A9 *  6/2007    Yahnker et al. ................. 429/62

FOREIGN PATENT DOCUMENTS

| JP | 09-266016 | 10/1997 |
|----|-----------|---------|
| JP | 2775600 B | 5/1998 |
| JP | 2959298 B | 7/1999 |
| JP | 11-307139 A | 11/1999 |
| JP | 2003-346924 A | 12/2003 |
| JP | 2005-19134 A | 1/2005 |
| WO | WO98/32186 A1 | 7/1998 |
| WO | WO 2005/086851 A2 | 9/2005 |

* cited by examiner

*Primary Examiner* — Patrick Ryan
*Assistant Examiner* — Ben Lewis
(74) *Attorney, Agent, or Firm* — Kenyon & Kenyon LLP

(57) ABSTRACT

A power supply device in which power storage bodies are disposed in a casing that houses a cooling medium is provided. The power supply device includes a moving portion that moves the power storage bodies in the cooling medium.

14 Claims, 7 Drawing Sheets

F I G . 2
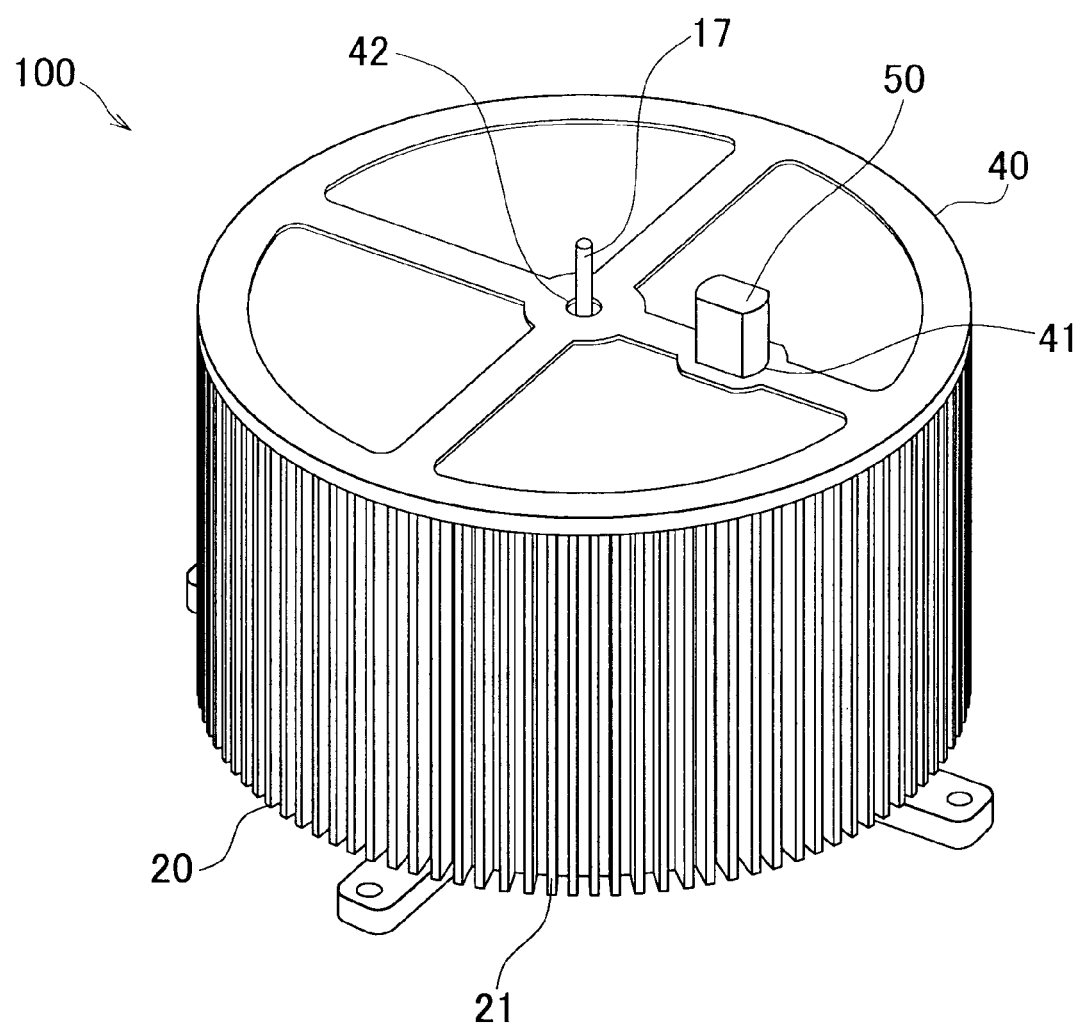

POWER SUPPLY DEVICE

This is a 371 national phase application of PCT/IB2008/000031 filed 9 Jan. 2008, claiming priority to Japanese Patent Application No. 2007-023588 filed 1 Feb. 2007, the contents of which are incorporated herein by reference.

BACKGROUND OF THE INVENTION

1. Field of the Invention

The invention relates to a power supply device, more specifically, to a cooling control for the power supply device.

2. Description of the Related Art

In recent years, a power supply device, such as a secondary battery or an electric double-layer capacitor (condenser), has been employed as a battery for a hybrid vehicle and an electric vehicle. In such a power supply device, a plurality of power storage bodies (e.g. battery cells and capacitors) are disposed close together to make the power supply device compact. Thus, the power supply device can output high electric power.

As the power supply device can output high electric power, cooling of the power storage bodies, which generate heat at the time of charging/discharging, is an important factor to make the output from the power storage bodies constant, to extend the lifetime of the power storage bodies, and to supply constant electric power. Normally, the temperature of the entire power supply device is controlled by cooling the power storage bodies using a cooling device (e.g. cooling mechanism) provided in the power supply device.

Examples of a method of cooling the power supply device (the power storage bodies) include a gaseous cooling method and a liquid cooling method. In these cooling methods, heat transferred from the power storage bodies to a gaseous or liquid cooling medium is transferred to a casing constituting a part of the power supply device, and then is discharged from the power supply device. The gaseous cooling medium used in the gaseous cooling method is much easier to handle than the liquid cooling medium used in the liquid cooling method. However, the gaseous cooling medium has lower heat conductivity than that of the liquid cooling medium. In contrast, in the liquid cooling method, the liquid cooling medium needs to be carefully handled. For example, a sealing mechanism needs to be provided to prevent leaking of the cooling liquid from the power supply device. However, the liquid cooling medium cools the power supply device (the power storage bodies) more efficiently than the gaseous cooling medium, because the liquid cooling medium has significantly higher heat conductivity than that of the gaseous cooling medium.

The gaseous cooling medium and the liquid cooling medium are different from each other in cooling characteristics, such as heat conductivity and viscosity. However, both of the cooling media function in the same manner. Therefore, if the heat generated from the power storage bodies is efficiently discharged from the power supply device through a cooling medium, the cooling efficiency is improved. Accordingly, the temperature control, that is, cooling control for the entire power supply device is performed by controlling the flow (convection) of the cooling medium. If flowability of the cooling medium is improved, the cooling efficiency is improved as well. For example, the cooling efficiency can be improved by agitating the cooling medium using an agitator to generate a forced convection.

Further, as described in Japanese Patent Application Publication No. 2005-19134 (JP-A-2005-19134), the cooling efficiency can be improved by the forced convection generated by circulating a cooling liquid in a battery apparatus using a pump. Similar technologies are described in Japanese Patent No. 2775600 and Japanese Patent Application Publication No. 9-266016 (JP-A-9-266016).

In the power supply device in which the plurality of power storage bodies are provided, if performance varies among the power storage bodies, the lifetime of the entire power supply device is decreased. More specifically, if the temperature of the cooling medium around the power storage bodies varies depending on the portion of the cooling medium, the cooling medium has a strong cooling effect on a part of the plurality of power storage bodies, and has a weak cooling effect on another part of the plurality of power storage bodies. Thus, the deterioration rate varies among the power storage bodies (or varies among portions in a single power storage body). This decreases the lifetime of the power supply device.

Accordingly, in the technologies described in the aforementioned publications, the cooling liquid is forcibly circulated (such that the cooling liquid flows into the battery apparatus through an inlet, and discharged from the battery apparatus through an outlet). However, in the power supply device in which the plurality of power storage bodies are disposed close together, the cooling liquid is not sufficiently circulated among the power storage bodies disposed close together. Therefore, for example, the temperature of the cooling liquid in areas among the power storage bodies differs from the temperature of the cooling liquid at the outer peripheries of the power storage bodies, and thus the power storage bodies cannot be appropriately cooled.

SUMMARY OF THE INVENTION

The invention provides a power supply device in which variation in the temperature of a cooling medium is reduced.

A first aspect of the invention relates to a power supply device in which a power storage body is disposed in a casing that houses a cooling medium. The power supply device includes moving means for moving the power storage body in the cooling medium.

According to the aforementioned first aspect, the moving means may include retaining means for retaining the power storage body, and drive means for rotating the retaining means.

Further, according to the aforementioned aspect, the retaining means may retain the power storage body such that an axis of the power storage body is inclined with respect to a rotational axis of the retaining means rotated by the drive means. Further, the retaining means may retain the power storage body such that an axis of the power storage body in a lengthwise direction of the power storage body is inclined with respect to a rotational axis of the retaining means rotated by the drive means.

Further, according to the aforementioned aspect, the retaining means may include a ring gear in which a gear portion is formed on an inner peripheral surface so that the gear portion engages with a rotary gear provided in the drive means. Further, the ring gear may be disposed on a side of the retaining means, which is opposite to a side facing the power storage body.

Further, according to the aforementioned aspect, a plurality of the power storage bodies may be disposed around a rotational center of the retaining means, and terminals of a set of the power storage bodies that are electrically connected in parallel or in series may be disposed at the rotational center of the retaining means.

Further, according to the aforementioned aspect, the power storage bodies may be connected by bus bars, and the power storage bodies may be connected to pivot joints by the bus bars, and the pivot joints are connected to the terminals, so as to move around the rotational axis of the retaining means.

A second aspect of the invention relates to a power supply device that includes a power storage module that includes a plurality of power storage bodies; a casing that houses the power storage module; a cooling medium that is filled in the casing; a lid member that covers the casing and seals the power storage module and the cooling medium in the casing; and a drive portion that moves the power storage module in the casing.

According to the aforementioned aspect, the drive portion may be a motor.

According to the aforementioned aspect, the power storage module may include a retaining member that retains the power storage bodies; a ring gear that engages with the drive portion; bus bars that connect the power storage bodies; and a positive terminal and a negative terminal that are connected to the respective bus bars. The bus bars may be pivotally connected to the positive terminal and the negative terminal through respectively pivot joints.

The power supply device according to the aforementioned aspect may further include a hollow cylindrical member disposed at a center of the casing, and the positive terminal and the negative terminal may be inserted through the cylindrical member.

According to the aforementioned aspect, the ring gear may be provided between the lid member and the retaining member so as to seal a portion inside the ring gear.

According to the invention, the variation in the temperature of the cooling medium can be reduced. Thus, it is possible to provide the power supply device that is stable and that has a long lifetime.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 2 is an external perspective view of the power supply device according to the first embodiment of the invention;

FIG. 4A is a perspective view showing a plurality of power storage bodies disposed on a retaining member, and FIG. 4B is a perspective view showing the plurality of power storage bodies that are electrically connected;

DETAILED DESCRIPTION OF EMBODIMENTS

Figure 1:
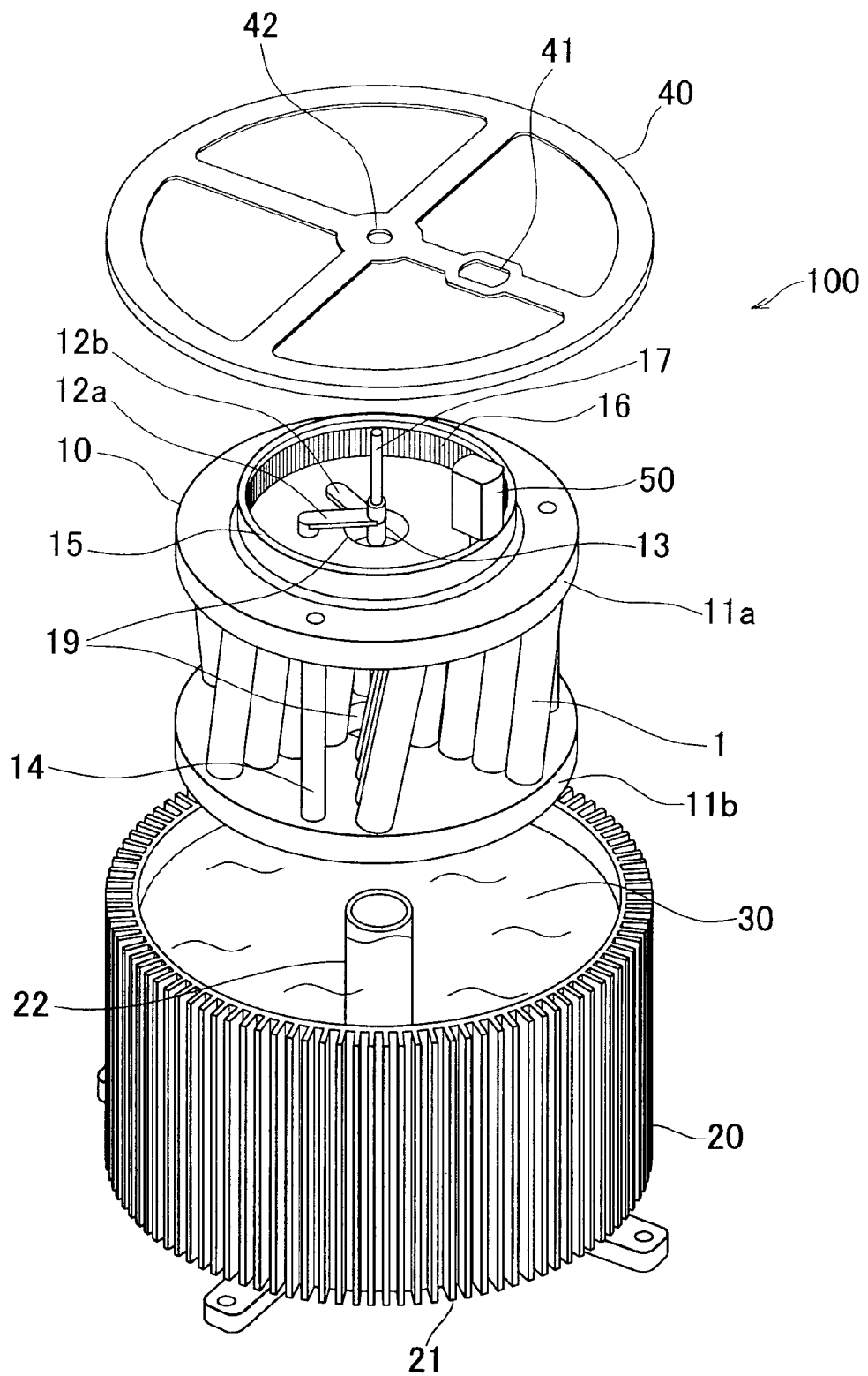
FIG. 1 is an exploded perspective view of a power supply device according to a first embodiment of the invention.

Referring to FIG. 1, a power supply device 100 according to an embodiment of the invention includes a power storage module 10, a casing 20, a cooling medium 30, a lid member 40, and a motor 50. The power storage module 10 includes a plurality of power storage bodies 1. The casing 20 houses the power storage module 10, and is filled with the cooling medium 30. The lid member 40 is placed on top of the casing 20 so as to seal the power storage module 10 and the cooling medium 30 in the casing 20. The motor 50 operates to rotate the power storage module 10.

Each of the power storage bodies 1 may be a battery cell (unit cell) or an electric double layer capacitor (condenser) in which a positive electrode and a negative electrode are stacked with an electrolyte membrane interposed therebetween. The power storage body 1 has a layer structure including at least one layer. FIG. 1 shows a cylindrical unit cell formed in a cylindrical shape as an example of the power storage body 1. However, the power storage body 1 may have any shape, for example, a square/rectangular column shape.

The casing 20 is provided with a plurality of radiation fins 21 on an outer peripheral surface, and houses the power storage module 10. Further, the cooling medium 30 is sealed in the casing 20, that is, the casing 20 is filled with the cooling medium 30. Therefore, a seal is provided inside the casing 20 so as to seal the cooling medium 30 in the casing 20 and prevent the cooling medium 30 from leaking. The casing 20 is cylindrically shaped as shown in FIG. 1. A hollow cylindrical member 22 is disposed at the center of the casing 20 in order to secure a wiring space for the power storage module 10, which will be described later in detail.

The lid member 40 is formed in a disc shape to fit the cylindrical shape of the casing 20. The lid member 40 is placed on top of the casing 20 to seal the power storage module 10 and the cooling medium 30 in the casing 20, and fixed to the case 20. Further, the lid member 40 includes an insertion hole 41 through which the motor 50 is inserted, and an insertion hole 42 through which a positive terminal 17 is inserted. The casing 20 and the lid member 40 are made of a metal such as aluminum or copper (or an alloy, e.g., aluminum alloy or a copper alloy). In the embodiment, the casing 20 is cylindrically shaped and the lid member 40 is disc-shaped. However, each of the casing 20 and the lid member 40 may have any shape. For example, the casing 20 and the lid member 40 may have a square/rectangular column shape and a square/rectangular plate shape, respectively.

A gaseous medium or a liquid medium is employed as the cooling medium 30 used in the power supply device 100 in the embodiment. Examples of the liquid medium include an automatic transmission fluid, silicone oil, and fluorine inert liquids, such as Fluorinert™, Novec™ HFE (hydrofluoroether), and Novec™ 1230, which are made by 3M Company. An insulating inert gas may be used as the gaseous medium. The casing 20 is filled with the gaseous or liquid cooling medium 30 to its maximum capacity, so that gas, e.g. air, does not enter the casing 20.

Figure 5:
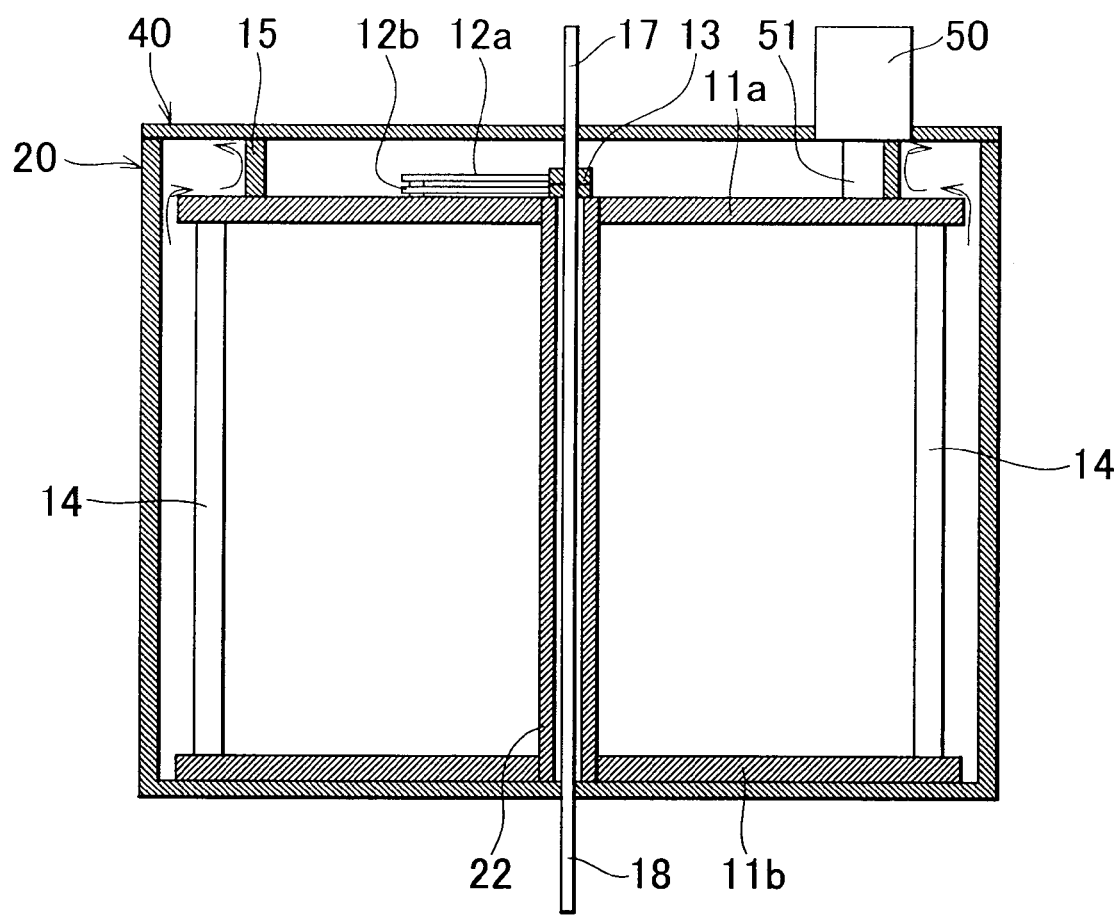
FIG. 5 schematically shows a sectional view of the power supply device according to the first embodiment of the invention.

The motor 50 functions as drive means for rotating the power storage module 10, that is, moving the power storage bodies 1 around a rotational axis of the power storage module 10, and includes a rotary gear 51 (as shown in FIG. 5) that engages with a gear portion 16 formed on an inner peripheral surface of a ring gear 15 of the power storage module 10, which will be described later.

Figure 3:
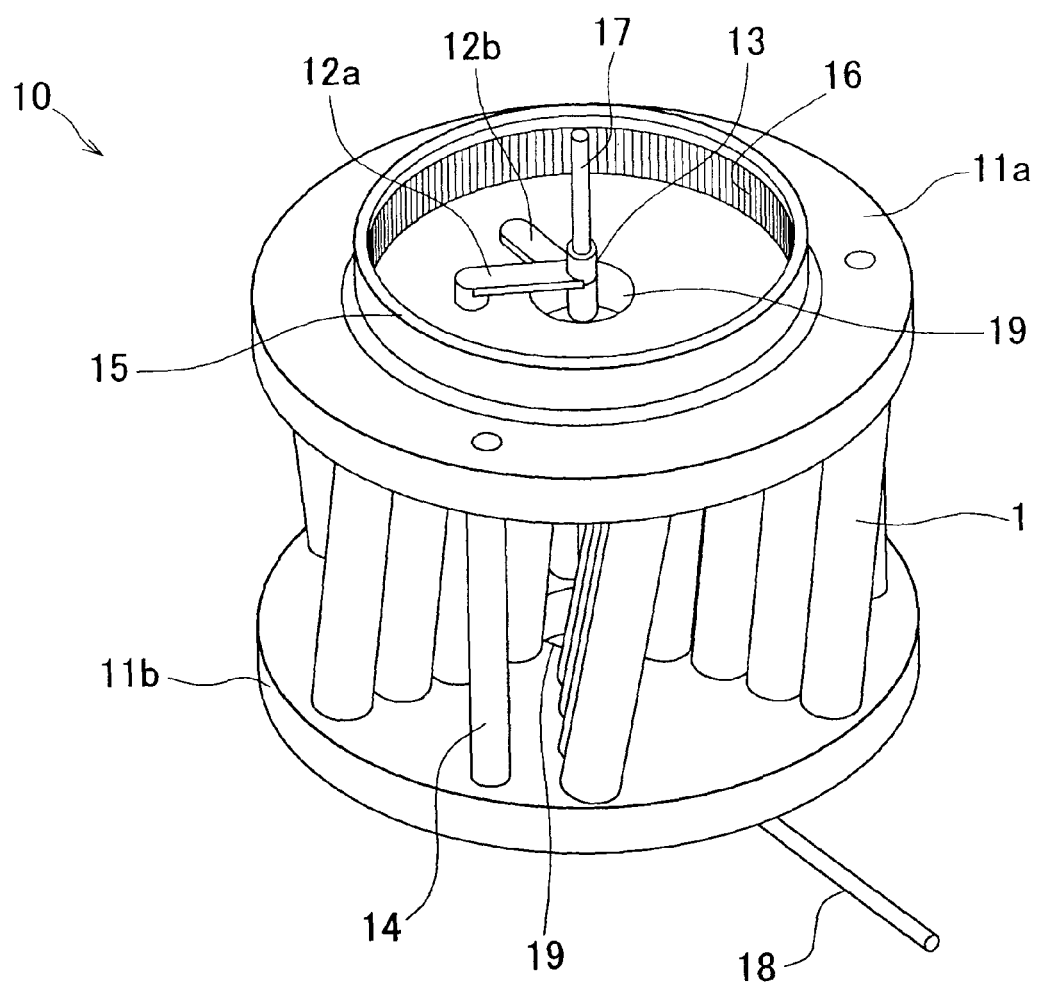
FIG. 3 is a perspective view showing a power storage module according to the first embodiment of the invention.
Figure 4A:
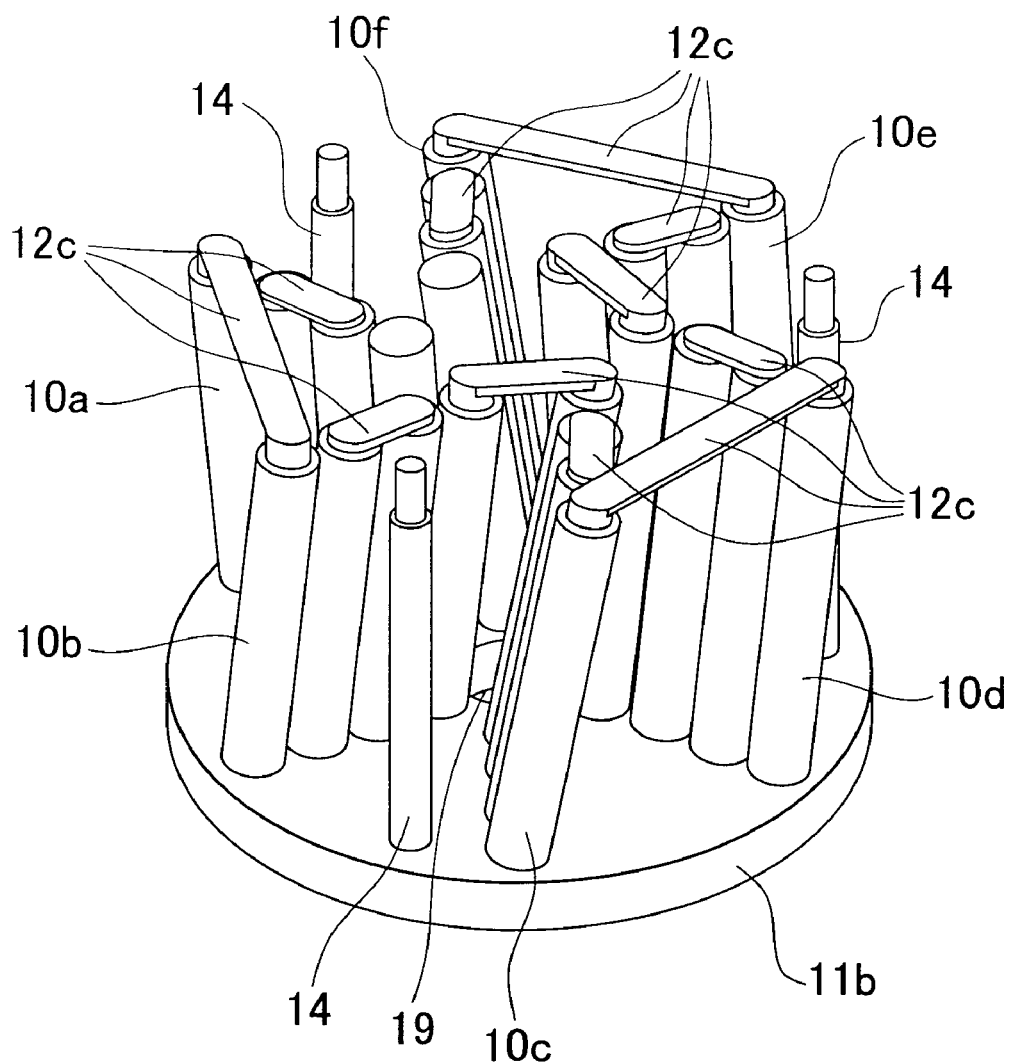
FIGS. 4A, 4B show the power storage module according to the first embodiment of the invention.
Figure 4B:
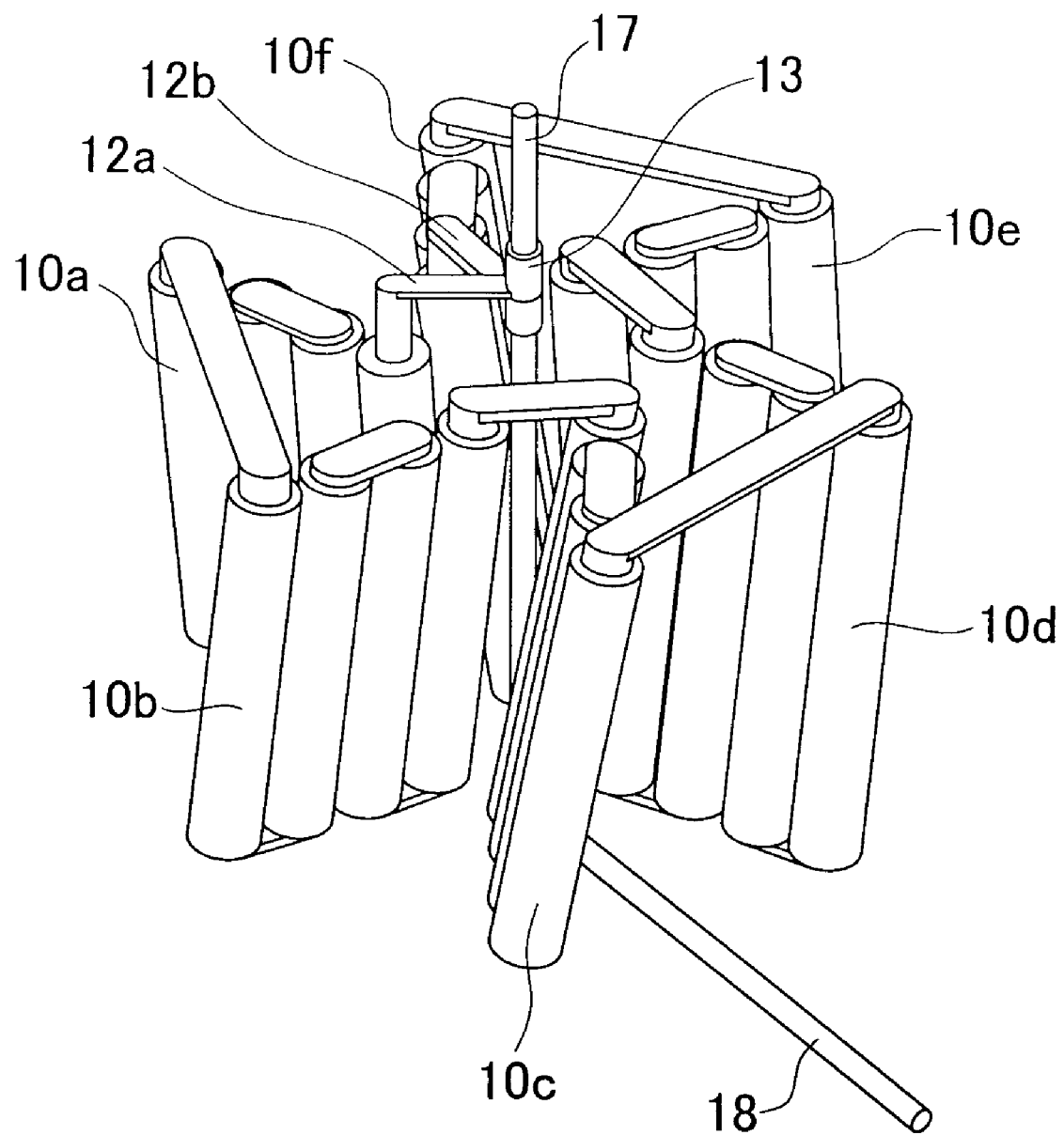

The power storage module 10 includes retaining members 11a, 11b, the ring gear 15, bus bars 12a, 12b, and 12c, pivot joints 13, column members 14, the positive terminal 17, and a negative terminal 18, as shown in FIG. 3 and FIGS. 4A and 4B. The retaining members 11a, 11b are disposed outside the ends of the power storage bodies 1 in the lengthwise direction of the power storage bodies 1 such that the power storage bodies 1 are interposed and retained between the retaining members 11a, 11b. The ring gear 15 includes the gear portion 16 on the inner peripheral surface thereof, and the gear portion 16 engages with the rotary gear 51 of the motor 50. The bus bars 12*a*, 12*b*, and 12*c* electrically connect the plurality of power storage bodies 1. The pivot joints 13 pivotally support the bus bars 12*a*, 12*b*, respectively, and the column members 14 are disposed between the retaining members 11*a*, 11*b*. The positive terminal 17 and the negative terminal 18 are connected to the bus bars 12*a*, 12*b*, respectively.

The retaining members 11*a*, 11*b* are plate members formed in a disc shape. An insertion portion 19 is formed at the center of each of the retaining members 11*a*, 11*b*. The cylindrical member 22 is inserted into the insertion portions 19. FIG. 5 is a sectional view schematically showing the power supply device 100. As shown in FIG. 5, when the retaining members 11*a*, 11*b* are disposed in the casing 20, the hollow cylindrical member 22 is inserted into the insertion portions 19.

A single power storage submodule is formed by combining several power storage bodies 1. The power storage bodies 1 are connected by the bus bars 12*c*, and the power storage submodules (10*a*, 10*b*, 10*c*, 10*d*, 10*e*, 10*f*) are connected by the bus bars 12*c*. In this way, all the power storage bodies 1 are electrically connected in parallel or in series.

As shown in FIG. 4B, the power storage submodule 10*a* is connected to the bus bar 12*a*, and the power storage submodule 10*f* is connected to the bus bar 12*b*. The bus bars 12*a*, 12*b* are connected to the positive electrode 17 and the negative electrode 18 disposed at the rotational center of the retaining members 11*a*, 11*b*, respectively. The positive terminal 17 is disposed at the rotational center of the retaining member 11*a*, and the negative terminal 18 is disposed at the rotational center of the retaining member 11*b*.

The bus bars 12*a*, 12*b* are disposed on an upper surface of the retaining member 11*a*, that is, inside the ring gear 15. The bus bars 12*a*, 12*b* are connected to the retaining member 11*a*, and connected to the terminals 17, 18, respectively, through the pivot joints 13 so as to prevent the bus bars 12*a*, 12*b* from interfering with the movement of the power storage bodies 1.

In this way, the power storage module 10 in the embodiment is configured such that the wiring for electrical connection is concentrated at the rotational center of the power storage module 10. Thus, the wiring does not interfere with the rotational motion of the power storage module 10. Further, the power storage module 10 disposed in the casing 20 is configured such that the pair of the positive terminal 17 and the negative terminal 18 are housed in the hollow cylindrical member 22, and connected to devices outside the power supply device 100.

The ring gear 15 and the motor 50 are the constituent elements that constitute moving means for rotating the power storage module 10, and the ring gear 15 is disposed on the retaining member 11*a*. The gear portion 16 is formed on the inner peripheral surface of the ring gear 15, and engages with the rotary gear 51 of the motor 50. The ring gear 15 is disposed on a surface of the retaining member 11*a*, which is opposite to a surface facing the power storage bodies 1. Further, the ring gear 15 is provided on the retaining member 11*a* such that a rotational axis (i.e. a rotational center) of the ring gear 15 matches a rotational axis (i.e. a rotational center) of the retaining member 11*a*.

As shown in FIG. 5, the ring gear 15 in the embodiment functions as a sealing member that seals the portion inside the ring gear 15 to protect the portion inside the ring gear 15 from the cooling medium 30. More specifically, when the power storage module 10 is disposed in the casing 20, the ring gear 15 is interposed between the lid member 40 and the retaining member 11*a* so that the cooling medium 30 is prevented from entering the portion inside the ring gear 15. Because the gear portion 16 is formed on the inner peripheral surface of the ring gear 15, the rotary gear 51 of the motor 50, and the bus bars 12*a*, 12*b*, the pivot joints 13, and the positive and negative terminals 17, 18, which are provided around the rotational center of the retaining member 11*a*, that is, in and around the cylindrical member 22, do not contact the cooling medium 30 and are isolated from the cooling medium 30 when housed in the casing 20.

The power storage bodies 1 (i.e. the power storage submodules) in the embodiment are disposed between the retaining members 11*a*, 11*b* such that the axes of the power storage bodies 1 in the lengthwise direction thereof are inclined with respect to the rotational axis of the power storage module 10 rotated by the motor 50.

Figure 6:
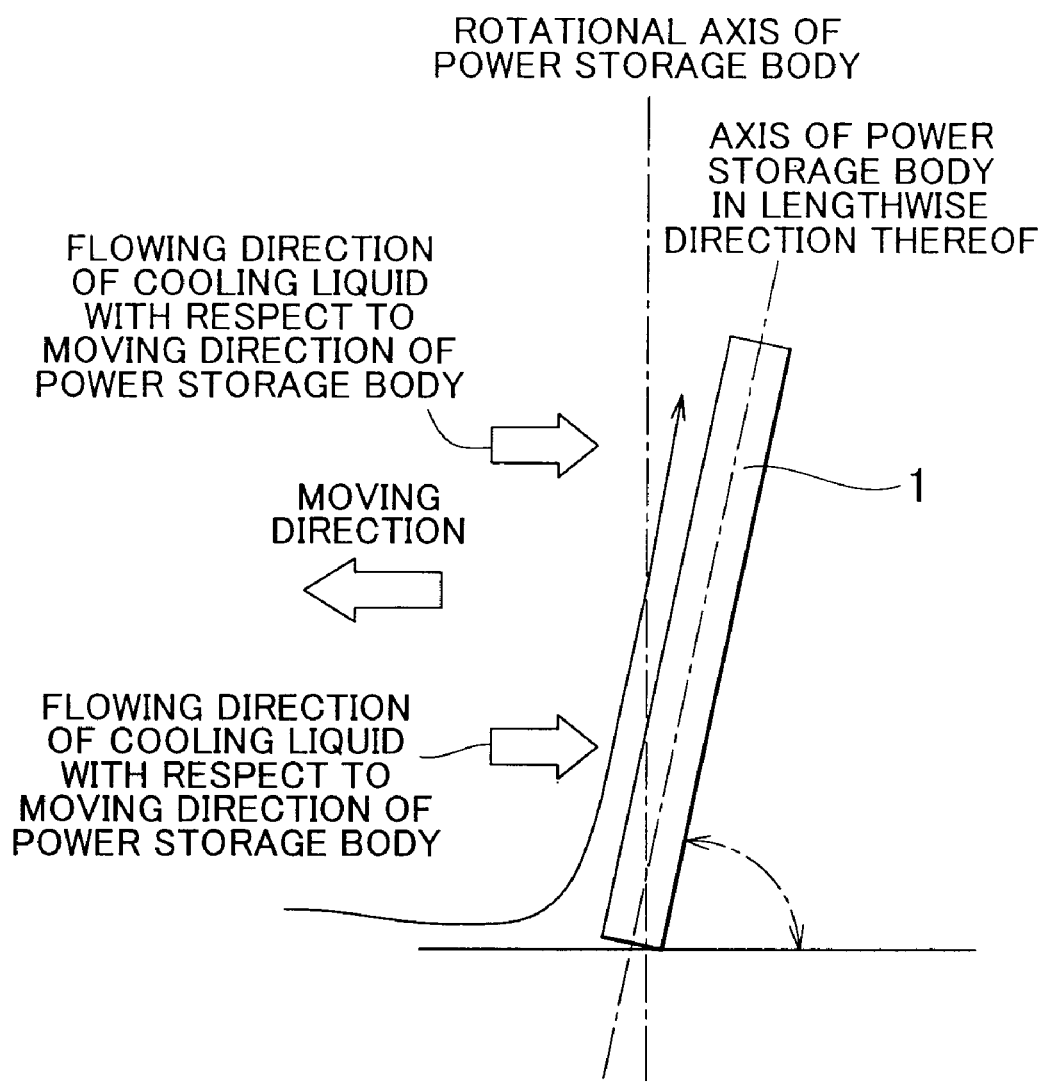
FIG. 6 illustrates how each power storage body is disposed and how a cooling medium flows according to the first embodiment of the invention.

FIG. 6 illustrates how the power storage bodies 1 are disposed in the power storage module 10 and how the cooling medium 30 flows in the power supply device 100. The drive power produced by the motor 50 rotates the rotary gear 51, and the rotational motion of the rotary gear 51 rotates the ring gear 15 because the rotary gear 51 engages with the gear portion 16 provided inside the ring gear 15. The rotational motion of the ring gear 15 rotates the retaining members 11*a*, 11*b* around the cylindrical member 22 provided in the casing 20. At this time, each of the power storage bodies 1 disposed between the retaining members 11*a*, 11*b* functions as an agitator to agitate the cooling medium 30.

In other words, according to the embodiment, the plurality of power storage bodies 1 move around the rotational axis of the retaining members 11*a*, 11*b* in a similar manner that a carousel pony moves in the merry-go-around, instead of controlling the flow of the cooling medium 30. Thus, the flow of portions of the cooling medium 30, which contact the power storage bodies 1, is promoted. The power storage bodies 1 move around the rotational axis of the retaining members 11*a*, 11*b*, in the cooling medium 30 filled in the casing 20 as the retaining members 11*a*, 11*b* rotate. As the power storage bodies 1 move around the rotational axis of the retaining members 11*a*, 11*b*, each of the power storage bodies 1 sequentially contacts different portions of the cooling medium 30 that flows in the opposite direction to the moving direction of the power storage bodies 1.

As shown in FIG. 6, the power storage bodies 1 are disposed between the retaining members 11*a*, 11*b* such that the axes of the power storage bodies 1 in the lengthwise direction thereof are inclined toward a side opposite to a side toward which the power storage bodies 1 move, with respect to the rotational axis of the power storage module 10 (i.e. the retaining members 11*a*, 11*b*). This configuration makes it possible to improve flowability of the cooling medium 30. More specifically, the power storage bodies 1 contact portions of the cooling medium 30 in a lower area of the casing 20 as the retaining members 11*a*, 11*b* rotate. Therefore, because the axes of the power storage bodies 1 in the lengthwise direction thereof are inclined toward the side opposite to the side toward which the power storage bodies 1 move, with respect to the rotational axis of the retaining members 11*a*, 11*b*, the portions of the cooling medium 30 in the lower area of the casing 20 are agitated by the power storage bodies 1 so as to flow from the lower area of the casing 20 to an upper area of the casing 20.

Thus, in the power supply device 100 according to the embodiment, the power storage module 10 including the plurality of power storage bodies 1 rotates in the cooling medium 30. This configuration makes it possible to reduce variation in the temperature of the cooling medium 30, and to equalize the temperature of the portions of the cooling medium 30, which contact the power storage bodies 1. In particular, in the embodiment, the movement of the power storage module 10, which rotates in the cooling medium 30, is controlled, instead of controlling the flow of the cooling medium 30. This makes it possible to promote the flow of the cooling medium 30, and further, to keep constant the speed of the flow (convection) of the cooling medium 30 that contacts the power storage bodies 1.

In other words, the flow (the flow speed) of the portions of the cooling medium 30, which contact the power storage bodies 1, can be controlled, and therefore an amount of heat transferred from the power storage bodies 1 to the cooling medium 30 (heat transfer amount between the power storage bodies 1 and the cooling medium 30) can be kept constant. This also makes it possible to reduce variation in the temperature distribution of the portions of the cooling medium 30, which contact the power storage bodies 1. As a result, variation in the temperature distribution of the entire cooling medium 30 can be reduced. Thus, in the power supply device 100, it is possible to avoid the situation where the cooling medium 30 has a strong cooling effect on a part of the power storage bodies 1, and has a weak cooling effect on another part of the power storage bodies 1. That is, it is possible to prevent the cooling effect from varying among the power storage bodies 1. Accordingly, the rate at which charging and discharging performance deteriorates is made uniform in the entire power storage bodies 1. Thus, the stable power supply device 100 can be provided.

Further, in the embodiment, the power storage bodies 1 are disposed between the retaining members 11a, 11b such that the axes of the power storage bodies 1 in the lengthwise direction thereof are inclined toward the side opposite to the side toward which the power storage bodies 1 move, with respect to the rotational axis of the power storage module 10 (the retaining members 11a, 11b). Therefore, the temperature of the cooling medium 30 filled in the casing 20 is prevented from varying between the upper area of the casing 20 and the lower area of the casing 20. As a result, the cooling medium 30 appropriately flows.

Further, in the configuration according to the embodiment, the positive and negative terminals 17, 18 are disposed together in the hollow cylindrical member 22, which is provided at the center of the casing 20 (that is, in the rotational center portion of the retaining members 11a, 11b), in order to supply the electricity to devices outside of the power supply device 100. This configuration makes it possible to reduce the size of the power supply device 100 without interfering with the rotational motion of the power storage module 10. Moreover, it is also possible to appropriately connect the power storage module 10 to the devices outside the power supply device 100.

The ring gear 15 in the embodiment functions as the sealing member that seals the portion inside the ring gear 15 to protect the portion inside the ring gear 15 from the cooling medium 30. That is, the ring gear 15 prevents the cooling medium 30 from entering the portion inside the ring gear 15. Therefore, the rotary gear 51 of the motor 50, and the bus bars 12a, 12b, the pivot joints 13, and the positive and negative terminals 17, 18, which are provided around the rotational center of the retaining member 11a, that is, in and around the cylindrical member 22, do not contact the cooling medium 30 and are isolated from the cooling medium 30. As a result, corrosion of these components can be prevented. Further, when a cooling liquid is used as the cooling medium 30, it is possible to avoid the situation where the rotational motion of the power storage module 10 is suppressed due to the viscosity of the cooling medium 30. Note that, the rotational speed of the power storage module 10 can be set to any speed according to the number of engaged teeth and the pitch of the gear portion 16 in the ring gear 15 and the rotary gear 51 of the motor 50. Thus, it is possible to rotate the power storage module 10 at an appropriate speed without using a transmission, etc.

In the aforementioned embodiment, a temperature sensor may detect temperatures of an upper portion and a lower portion of the cooling medium 30 filled in the casing 20, and a temperature control portion may perform drive control for the motor 50 according to the difference between the temperature of the upper portion and the temperature of the lower portion detected as above. In this case, for example, the temperature control portion performs the drive control for the motor 50 when the temperature difference is 2° C. to 5° C.

Alternatively, the plurality of power storage bodies 1 included in the power storage submodules (10a, 10b, 10c, 10d, 10e), which constitute the power storage module 10, may be provided at predetermined intervals so as to allow the cooling medium 30 to flow between the power storage bodies 1.

The aforementioned embodiment is described using the power storage body, such as a battery cell or an electric double-layer capacitor (condenser), as one example. However, the invention may be applied to, for example, a fuel cell.

In the embodiment, the retaining members 11a, 11b are disposed outside the ends of the power storage bodies 1 in the lengthwise direction of the power storage bodies 1 such that the power storage bodies 1 are interposed and retained between the retaining members 11a, 11b. However, the invention is not limited to this configuration. For example, the retaining members 11a, 11b may be disposed outside ends of the power storage bodies 1 in an axial direction of the power storage bodies 1 such that the power storage bodies 1 are interposed and retained between the retaining members 11, 11b.

The invention claimed is:

1. A power supply device comprising:
   a casing,
   a power storage body disposed in the casing,
   a moving device that moves the power storage body within the casing, and
   a liquid medium housed in the casing that is in contact with the power storage body;
   wherein the moving device includes a retaining member that retains the power storage body, and a drive device that rotates the retaining member; and
   wherein the retaining member retains the power storage body such that an axis of the power storage body in a lengthwise direction of the power storage body is inclined with respect to a rotational axis of the retaining member rotated by the drive device.

2. The power supply device according to claim 1, wherein a plurality of the power storage bodies are disposed around a rotational center of the retaining member.

3. The power supply device according to claim 2, wherein the plurality of the power storage bodies are disposed in a radial direction of the retaining member.

4. The power supply device according to claim 1, further comprising:
   a power storage module that includes a plurality of the power storage bodies; and
   a lid member that covers the casing and seals the power storage module and the liquid medium in the casing,
   wherein the moving device includes a drive portion that moves the power storage module in the casing.

5. The power supply device according to claim 4, wherein the drive portion is a motor.

6. The power supply device according to claim 4, wherein the plurality of the power storage bodies are disposed in the radial direction of the power storage module.

7. A power supply device comprising:
a casing,
a power storage body disposed in the casing,
a moving device that moves the power storage body within the casing, and
a liquid medium housed in the casing that is in contact with the power storage body;
wherein the moving device includes a retaining member that retains the power storage body, and a drive device that rotates the retaining member;
wherein the retaining member include a ring gear in which a gear portion is formed on an inner peripheral surface so that the gear portion engages with a rotary gear provided in the drive device; and
wherein the ring gear is disposed on a side of the retaining member which is opposite to a side facing the power storage body.

8. The power supply device according to claim 7, wherein a plurality of the power storage bodies are disposed around a rotational center of the retaining member.

9. The power supply device according to claim 8, wherein the plurality of the power storage bodies are disposed in a radial direction of the retaining member.

10. A power supply device comprising:
a casing,
a power storage body disposed in the casing,
a moving device that moves the power storage body within the casing, and
a liquid medium housed in the casing that is in contact with the power storage body;
wherein the moving device includes a retaining member that retains the power storage body, and a drive device that rotates the retaining member;
wherein a plurality of the power storage bodies are disposed around a rotational center of the retaining member; and
wherein terminals of a set of the power storage bodies that are electrically connected in parallel or in series are disposed at the rotational center of the retaining member.

11. The power supply device according to claim 10, wherein:
the power storage bodies are connected by bus bars; and
wherein the power storage bodies are connected to pivot joints by the bus bars, and the pivot joints are connected to the respective terminals so that the power storage bodies move around the rotational axis of the retaining member.

12. A power supply device comprising:
a casing,
a power storage body disposed in the casing,
a moving device that moves the power storage body within the casing, and
a liquid medium housed in the casing that is in contact with the power storage body;
wherein the power supply device further comprises a power storage module that includes a plurality of the power storage bodies; and a lid member that covers the casing and seals the power storage module and the liquid medium in the casing,
wherein the moving device includes a drive portion that moves the power storage module in the casing;
wherein the power storage module includes:
a retaining member that retains the power storage bodies;
a ring gear that engages with the drive portion;
bus bars that connect the power storage bodies; and
a positive terminal and a negative terminal that are connected to the respective bus bars; and
wherein the bus bars are pivotally connected to the positive terminal and the negative terminal through respectively pivot joints.

13. The power supply device according to claim 12, further comprising a hollow cylindrical member disposed at a center of the casing, wherein the positive terminal and the negative terminal are inserted through the cylindrical member.

14. The power supply device according to claim 12, wherein the ring gear is provided between the lid member and the retaining member so as to seal a portion inside the ring gear.

* * * * *